(12) United States Patent
Koseoglu et al.

(10) Patent No.: US 10,400,183 B2
(45) Date of Patent: Sep. 3, 2019

(54) INTEGRATED PROCESS FOR ACTIVATING HYDROPROCESSING CATALYSTS WITH IN-SITU PRODUCED SULFIDES AND DISULPHIDES

(71) Applicant: SAUDI ARABIAN OIL COMPANY, Dhahran (SA)

(72) Inventors: Omer Refa Koseoglu, Dhahran (SA); Robert Peter Hodgkins, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/267,942

(22) Filed: Feb. 5, 2019

(65) Prior Publication Data

US 2019/0194555 A1    Jun. 27, 2019

Related U.S. Application Data

(62) Division of application No. 15/793,351, filed on Oct. 25, 2017, now Pat. No. 10,240,096.

(51) Int. Cl.
*C10G 53/12* (2006.01)
*B01J 37/20* (2006.01)
(Continued)

(52) U.S. Cl.
CPC .............. *C10G 53/12* (2013.01); *B01J 37/20* (2013.01); *C10G 19/02* (2013.01); *C10G 21/30* (2013.01); *C10G 29/10* (2013.01); *C10G 53/14* (2013.01); *C10L 3/103* (2013.01); *C10G 2300/202* (2013.01); *C10G 2300/4006* (2013.01); *C10G 2300/4012* (2013.01); *C10G 2300/703* (2013.01)

(58) Field of Classification Search
CPC ........ C10G 53/12; C10G 29/10; C10G 53/14; C10G 19/02; C10G 21/30; C10G 2300/4006; C10G 2300/202; C10G 2300/703; C10G 2300/4012; C10L 3/103; B01J 37/20
See application file for complete search history.

(56) References Cited

U.S. PATENT DOCUMENTS 2,428,623 A    10/1947   Hewlett et al.
2,693,442 A    11/1954   Tom et al.
(Continued)

FOREIGN PATENT DOCUMENTS

CN      105175296 A       12/2015
KR      WO 01/96499    *  12/2001
(Continued)

OTHER PUBLICATIONS

A. S. Afshar, et al., "Study on Effective Parameters in Caustic Regeneration on LPG Sweetening," Petroleum Science and Technology, 32(15:1861-1867 (Jun. 2014).

*Primary Examiner* — Randy Boyer
*Assistant Examiner* — Juan C Valencia
(74) *Attorney, Agent, or Firm* — Abelman, Frayne & Schwab

(57) ABSTRACT

The invention involves an integrated process in which a hydrocarbon feedstock is treated with a caustic (alkaline) extraction to remove sulfides, disulfides, and mercaptans. These extracted materials are further treated, and are then used to activate hydrotreating catalysts.

10 Claims, 5 Drawing Sheets

(51) Int. Cl.
*C10G 53/14* (2006.01)
*C10L 3/10* (2006.01)
*C10G 19/02* (2006.01)
*C10G 21/30* (2006.01)
*C10G 29/10* (2006.01)

(56) References Cited

U.S. PATENT DOCUMENTS

| | | |
|---|---|---|
| 3,104,157 A | 9/1963 | Kimberlin, Jr. et al. |
| 4,626,341 A * | 12/1986 | Verachtert .............. C10G 19/08 208/235 |
| 4,705,620 A | 11/1987 | Bricker et al. |
| 8,308,957 B2 | 11/2012 | Zhang et al. |
| 2009/0065434 A1 | 3/2009 | Zhang |
| 2010/0210741 A1 * | 8/2010 | Kharas .................... B01J 23/85 518/714 |
| 2011/0172138 A1 * | 7/2011 | Forquy ................ C07C 303/16 512/21 |
| 2015/0034529 A1 | 2/2015 | Trucko et al. |
| 2015/0284264 A1 | 10/2015 | Kumfer et al. |
| 2016/0145502 A1 | 5/2016 | Koseoglu |

FOREIGN PATENT DOCUMENTS

| | | |
|---|---|---|
| SU | 1395628 A1 | 5/1988 |
| WO | 1994014525 A1 | 7/1994 |
| WO | 0196499 A1 | 12/2001 |
| WO | 2015136491 A1 | 9/2015 |

\* cited by examiner

FIG. 3  Spent caustic regeneration process to produce mercaptan oil

INTEGRATED PROCESS FOR ACTIVATING HYDROPROCESSING CATALYSTS WITH IN-SITU PRODUCED SULFIDES AND DISULPHIDES

RELATED APPLICATION

This application is a divisional of application Ser. No. 15/793,351 filed Oct. 25, 2017, incorporated by reference in its entirety.

FIELD OF THE INVENTION

The invention relates to the activation of hydroprocessing catalysts using mercaptans, sulfides and disulfides extracted from caustic or alkaline solution. It also relates to purification of these materials, as well as their use in the activation of hydroprocessing catalysts.

BACKGROUND AND PRIOR ART

During the processing of hydrocarbon feedstocks in, e.g., petrochemical refineries, sulfur containing compounds are removed from the feedstock by contact with a caustic (i.e., alkaline) solution, into which the sulfur containing compounds (e.g., thiosulfates) dissolve. Among the materials which can be treated this way are natural gas, fuel gas, liquefied petroleum gas, pentane mixtures, light straight run naphtha, light thermally cracked naphtha, full straight run naphtha, full FCC cracked naphtha, heavy SR naphtha, aviation turbine fuel, kerosene, and distillate fuels with boiling points up to 350° C. (The skilled artisan will recognize that this listing is exemplary and hardly cumulative or exhaustive). While this is a standard, efficient process, the result is a spent, caustic solution which must be addressed. These spent solutions, containing dissolved sulfur compounds, must be treated to avoid environmental and other problems.

Conventional techniques are available for dealing with the problem of the spent caustic solutions. Most common is so-called "wet air oxidation," where after oxidation with air, disulfides result, and the caustic solution is regenerated. The mixed disulfides, sometimes referred to as "disulfide oil," (DSO) can then be treated via, e.g., hydrotreating or hydrocracking. See, e.g., Published U.S. Patent Application 2016/0108333, incorporated by reference. While this is a useful process, it requires hydrogen, which makes it expensive. Burning, or otherwise disposing of the disulfide oil is possible, but far from desirable.

The field of petrochemistry is familiar with the so-called "MEROX" process. As its name suggests, the MEROX process involves oxidation of mercaptans in hydrocarbon mixtures, via the basic reaction:

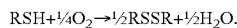

The process requires an organometallic catalyst and an alkaline solution in order to accelerate oxidation and to proceed at an economically practical rate. The process is important for the disposition of sulfur containing compounds removed from hydrocarbon feedstocks in petroleum refining.

In the equation provided supra, "R" is a hydrocarbon chain of variable length, which may be saturated, unsaturated, branched, cyclic, or any form of hydrocarbon found in petroleum feedstocks, crude oil, etc. Generally, these feedstocks contain mixtures of compounds of the formula RSH, where R and R', infra, can contain 1 to 10 carbon atoms, or even more then 10, but R and R', infra, preferably contains 1-8 carbons.

Indeed, the wide variety of hydrocarbons makes the following reaction scheme more accurate.

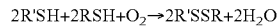

MEROX processes involve either liquid streams, or mixtures of liquid and gas streams.

When the starting material, i.e., the feedstock, is liquid only, the disulphides remain in the reaction product and the total sulfur content does not change. The vapor pressure of the resulting disulphides is low as compared to mercaptans, so their presence is far less objectionable then that of mercaptans. On the other hand, the disulphides are not environmentally acceptable and their disposal is difficult.

In practice, liquid stream feedstocks are usually treated in a fixed bed reactor system over a catalyst, such as activated charcoal impregnated with a MEROX reagent, and wetted by a caustic, alkaline solution. Air is injected into the feedstock ahead of the reactor, and as the feedstock passes through the wetted, catalyst impregnated bed, mercaptans are oxidized to disulphides. Because the disulphides are insoluble in the caustic, alkaline solution, they remain with the other hydrocarbons, and complex processes to remove them must be employed.

When the feedstock is a mix of gas and liquid, the disulphides can be extracted into the alkaline solution. The degree of extraction depends, inter alia, on the molecular weight of the mercaptans, their degree of branching, the concentration of the alkaline solution, and the reaction temperatures.

The disulphide oil which results from the MEROX reaction discussed supra is a mix of various disulphides. Table 1, which follows, shows the disulphide oil composition obtained following oxidation of compositions containing propane, butane, and mercaptans:

TABLE 1

Composition of disulfide oil.

| Disulfide Oil | W % | BP | MW | Sulfur, W % |
| --- | --- | --- | --- | --- |
| Di-Methyl Di-Sulfide | 18 | 110 | 94 | 68.1 |
| Di-Ethyl Di-Sulfide | 46 | 152 | 122 | 52.5 |
| Di-Propyl Di-Sulfide | 33 | 195 | 150 | 42.7 |
| Methyl Ethyl Di-Sulfide | 1 | 121 | 108 | 59.3 |
| Ethyl Propyl Di-Sulfide | 2 | 168 | 136 | 47.1 |
| Total | 100 | 158.64 | 126.3 | 52.0 |

As noted, supra, the disulphide oil is problematic. It can be added to fuel oil, or be further processed in a hydrotreating/hydrocracking unit, which increases expenses because of the need for hydrogen. Given the issues surrounding this byproduct of hydrocarbon processing, there is a need to utilize the byproduct and/or dispose of it, within the confines of a refinery.

Hydroprocessing catalysts, especially those containing Ni and/or Mo oxides, as well as Co and/or W oxides, require activation to achieve maximum potential conversion of the oxides to corresponding sulfides, is the industry standard, viz:

TABLE 2

Activating reactions.

| Metal Oxide | Reactants | k | Products |
|---|---|---|---|
| $MoO_3$ | $1MoO_3 + H_2 + 2H_2S$ | -> | $MoS_2 + 3H_2O$ |
| NiO | $3NiO + H_2 + 2H_2S$ | -> | $Ni_3S_2 + 3H_2O$ |
| CoO | $9CoO + H_2 + 8H_2S$ | -> | $Co_9S_8 + 9H_2O$ |
| $WO_3$ | $1WO_3 + H_2 + 2H_2S$ | -> | $WS_2 + 3H_2O$ |

Standard methods to carry out this reaction include in-situ gas phase activation, or liquid phase activation, each of which may use a sulfur spiking agent, but need not do so. An ex situ pre-activated catalyst can also be used. Of these options, liquid phase in-situ activation with a sulfur spiking agent is most common. The following table lists the most frequently used agents, and some of their properties:

TABLE 3

Catalyst activating agents.

| Name | Sulfur, W % | MW, g/g · mol | SG | BP, ° C. |
|---|---|---|---|---|
| Di-methyl-di-suifide (DMDS) | 68 | 94 | 1.060 | 109 |
| di-methyl-sulfide (DMS) | 52 | 62 | 0.840 | 36 |
| di-methyl-sulfoxide (DMSO) | 41 | 78 | 1.100 | 189 |
| N-butyl-Mercaptan | 36 | 90 | 0.850 | 96 |
| Tertiary-butyl-poly-sulfide (TBPS) | 54 | 242 | 1.100 | — |
| Tertiary-nonyl-poly-sulfide (TNPS) | 37 | 414 | 1.040 | — |

The materials of Table 3 are converted fully to $H_2S$ and hydrocarbons, while the $H_2S$ converts the oxides into sulfides, as shown by Table 2.

The conditions under which disulphides, mercaptans, and mixtures of these decompose to hydrocarbons and hydrogen sulphide include a hydrotreating catalyst, and temperatures from 150-260° C.

As noted, supra, the prior art has long used commercially available disulphides to activate hydroprocessing and hydrocracking catalysts. This invention unites two separate areas of technology used, in petrochemical processes. In brief, it involves removal of sulfur compounds by caustic solvents and their conversion to mercaptans and/or disulphides and then use of this potentially problematic waste product to activate catalysts directly.

How this is accomplished will be seen in the disclosure which follows.

DETAILED DESCRIPTION OF PREFERRED EMBODIMENTS

Figure 1:
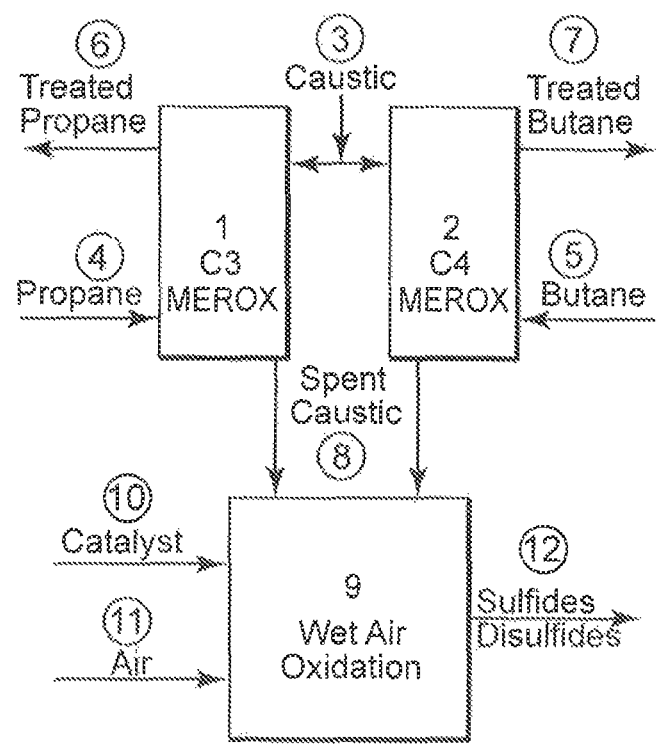
FIG. 1 shows a conventional MEROX process.

Referring to FIG. 1, which shows a conventional MEROX process, one has two reaction vessels "1" and "2," for treatment of propane ("1") and butane ("2"), obtained during refining. The propane and butane are not pure, and they are contacted to an alkaline or caustic solution introduced to the reaction vessel by "3." The contact takes place at a temperature that is preferably 40-60° C., but can range from 15-80° C., and a pressure which can range from 10-50 bars. Impure propane or butane "4" or "5" enters the reaction vessel "1" or "2", and after contact with the caustic solution, leaves, as shown by "6" and "7."

The caustic alkaline solution, which contains various thiolates of formula X—S—R, where X is an alkaline ion such as $K^+$, or $Na^+$, or some other component of an alkaline compound and R is as discussed supra, moves "8" to a second reaction vessel "9," which contains a catalyst "10," and to which oxygen containing air "11" is introduced. The contact preferably takes place at a temperature of from 20° C. to 300° C., more preferably at a temperature from 20° C. to 80° C. Following oxidation, a minor proportion of sulfides and a major proportion of disulfides "12" are produced, and are treated as discussed infra.

Figure 2:
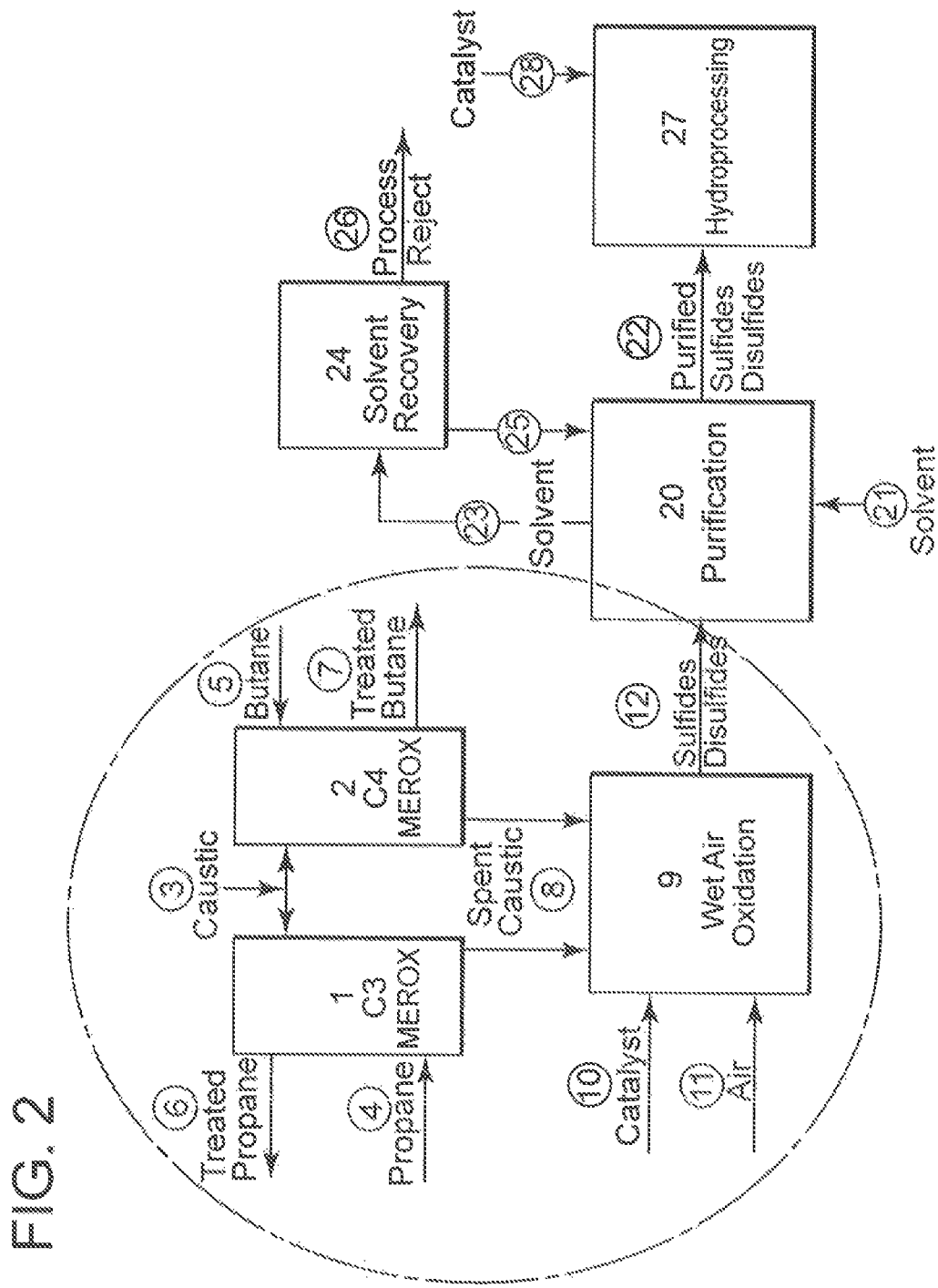
FIG. 2 shows one embodiment of the invention, where DSO is produced and purified, then used to activate catalysts.

FIG. 2 shows one embodiment of the invention, where following the process elaborated supra, the solvent "12" containing the sulfides and disulfides is moved to a further reaction vessel "20," where solvent "21" is added and sulfides/disulphides are separated from the solvent into "22" (sulfides and disulfides) and "23" (solvent). The solvent is cleaned in solvent recovery vessel "24" and may be either reused "25," or disposed of "26," while purified sulfides/disulfides 22 move to a further reaction vessel "27," containing an inactive, hydroprocessing catalyst. Following contact, activated catalyst "28" is formed and is used in further processes. The cleaning of the solvent may be accomplished via various art recognized methodologies. Exemplary, but not inclusive, are a water wash, which removes water soluble sulfur containing compounds, and adsorption with, e.g., activated carbon, alumina, silica alumina, sand, a zeolite, or regenerated, spent catalyst.

Figure 3:
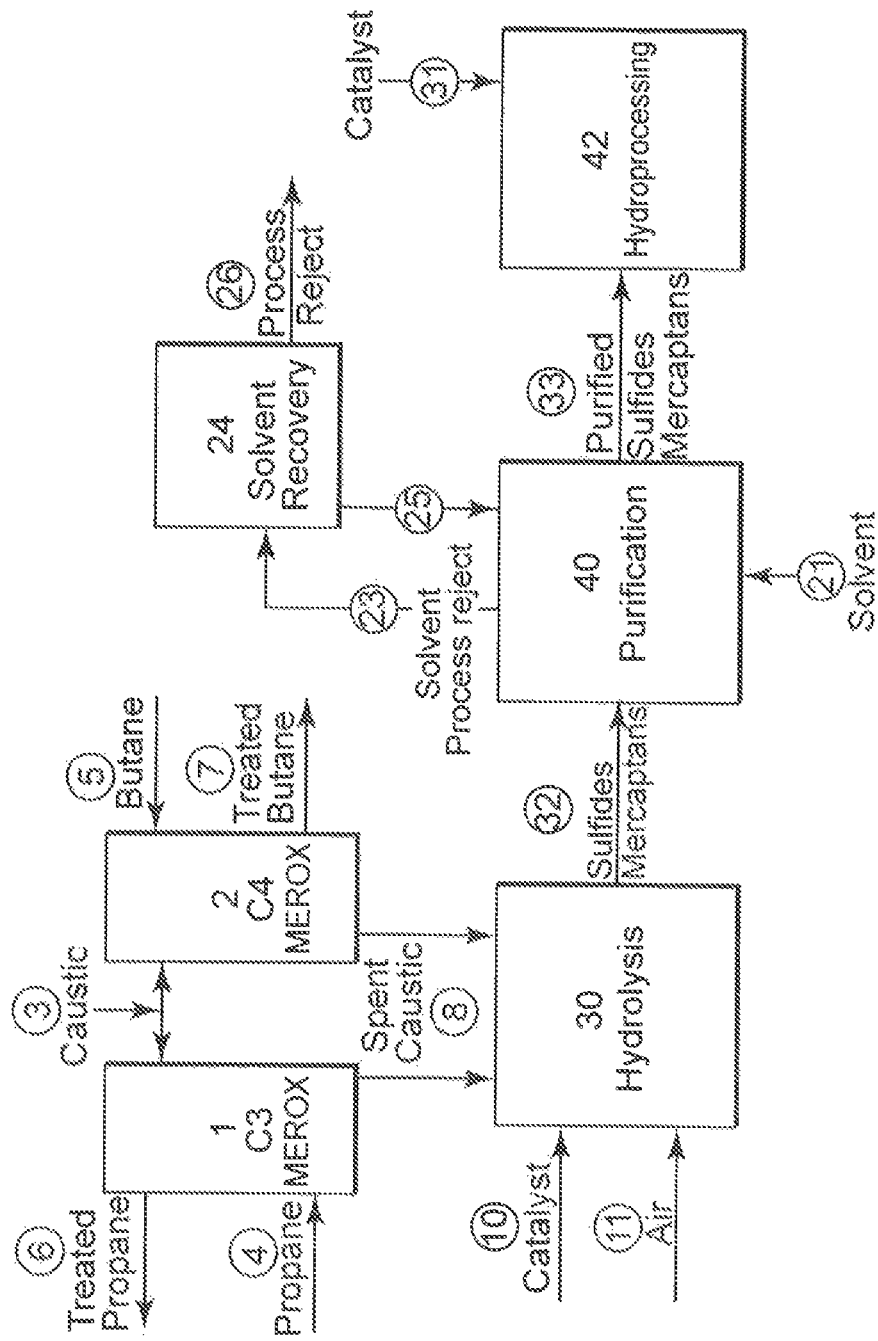
FIG. 3 shows a further embodiment of the invention in which extracted thiolates are converted to mercaptans, which are then used to activate catalysts.

FIG. 3 shows an embodiment of the invention very similar to that shows in FIG. 2, except that, in the vessel "30" comparable to "9" in FIG. 2, hydrolysis, using an acid rather than air, takes place, to form mercaptans of formula RSH, as defined supra, and sulfides. The mercaptan containing solution moves to purification reactor 40 via means 32 and is treated as described herein. This contact preferably takes place at a temperature of from 20° C. to 100° C., more preferably, at a temperature from 20° C. to 80° C. A further difference is that in this embodiment the product "33" leaving reactor "40" is a mixture of purified sulfides and mercaptans.

Figure 4:
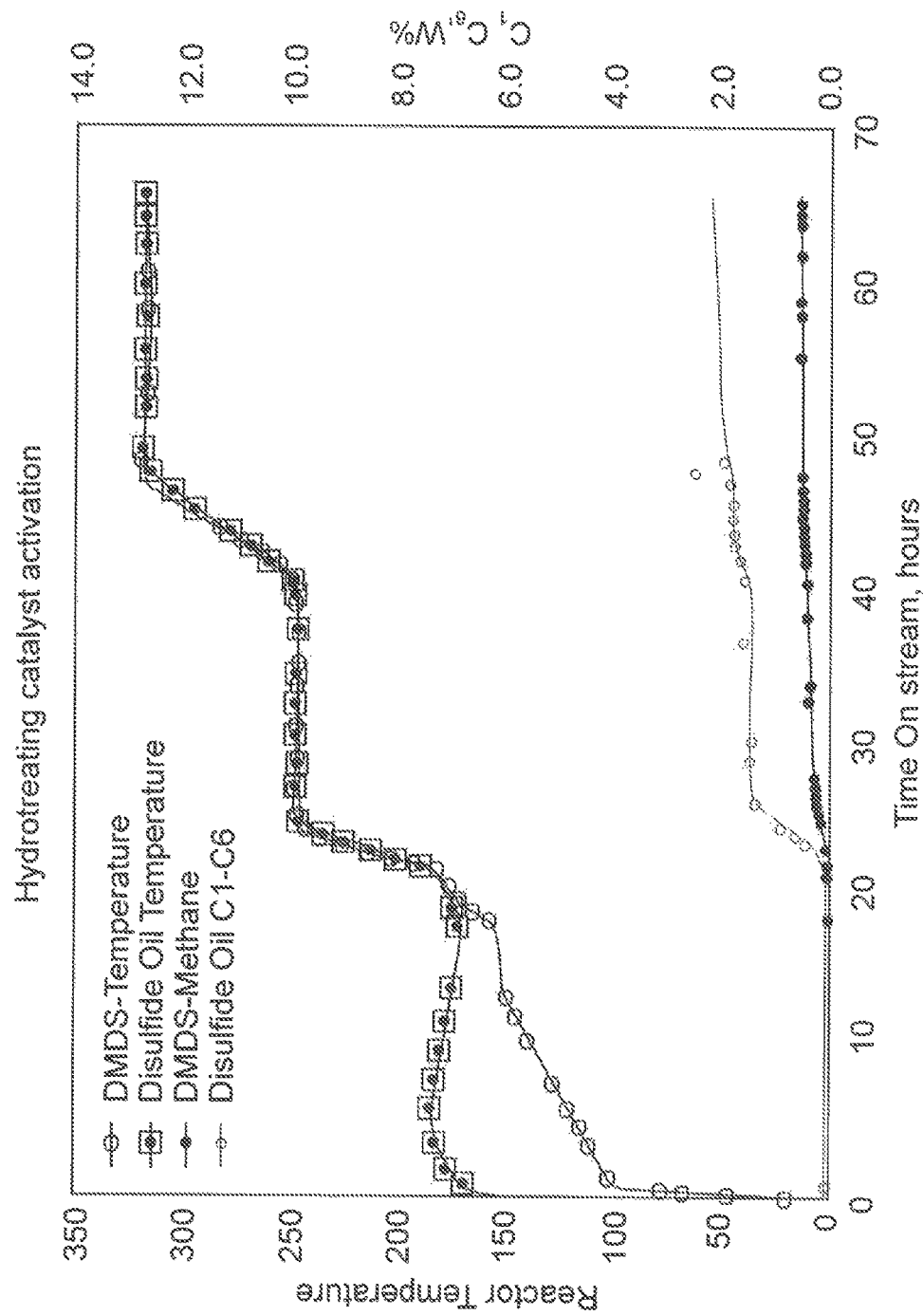
FIG. 4 shows activation of a hydrotreating catalyst using a commercial disulfide and the extracted disulfide formed from the MEROX process as described in the invention.

FIG. 4 is a further depiction of the activation of hydrotreating catalysts using DSO prepared in accordance with the invention, and used in the integrated process of the invention and is compared to the activation of the same catalyst using a commercially available disulfide.

Figure 5:
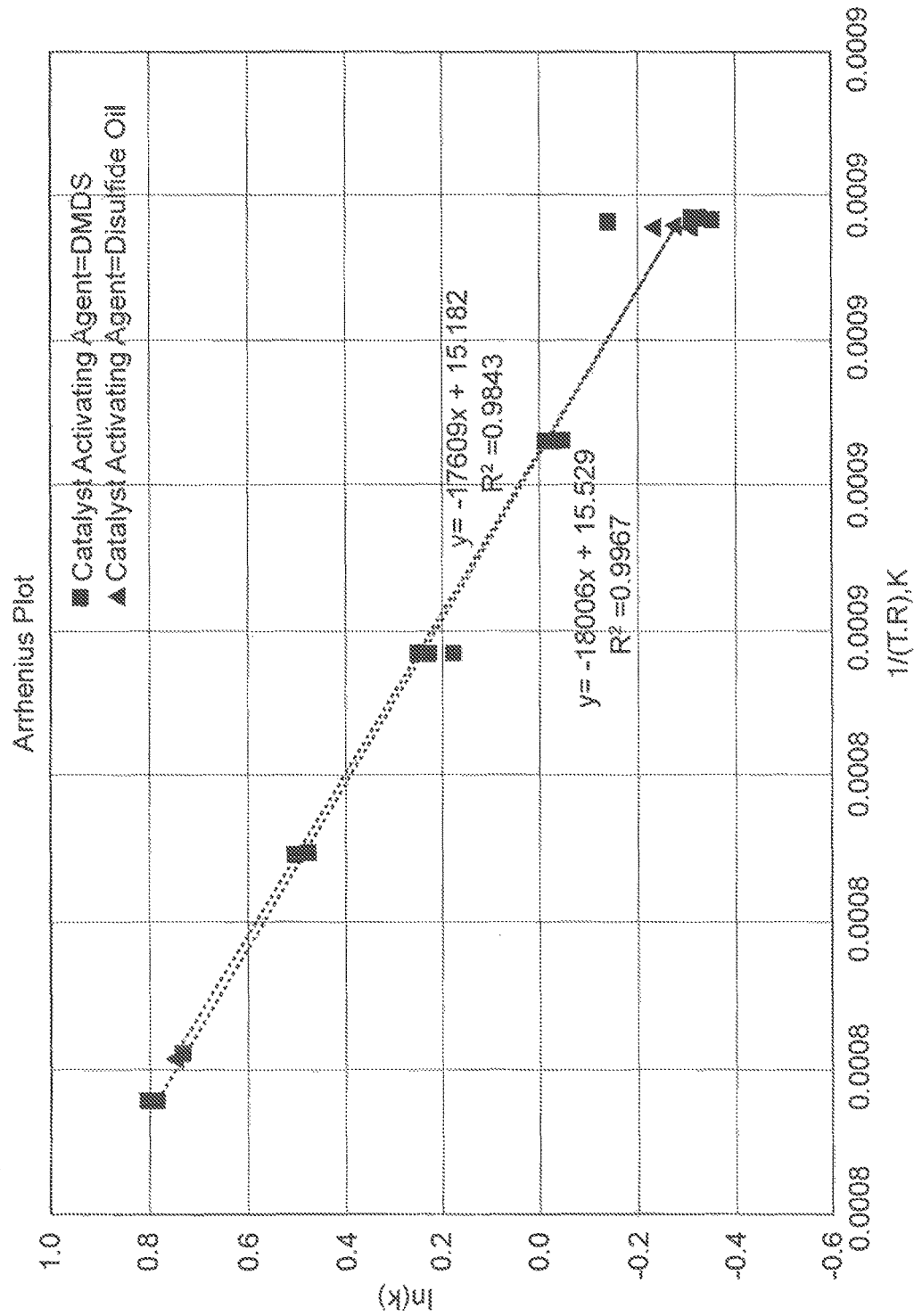
FIG. 5 shows hydrotreating catalyst activity for a catalyst activated using commercial disulfide and the extracted disulfide formed from the MEROX process according to the invention.

FIG. 5 shows the hydrotreating catalyst activity experimental results when sulfiding the catalyst with the disulfide prepared in accordance with the invention and a commercially available disulfide.

As noted, supra, the MEROX reaction, as well as methods for separating the products produced in the oxidation of mercaptans, are known. What is not taught by the art, and which will be elaborated upon infra, is the use of these sulfide compounds as catalyst activation agents, especially in an integrated process whereby mercaptans in a hydrocarbon feedstock are oxidized, the sulfide oxidation products are used directly to activate catalysts which are used as part of the integrated process.

Example 1

Two diesel hydrotreating pilot plant tests were conducted. The catalyst to be activated, in each test, was an Ni—Mo hydrocracking catalyst in oxide form. The mode of activating the catalyst was to contact it with either commercially available DMDS, or recovered DSO, obtained via the integrated process of the invention.

Activating solutions were prepared using kerosene fractions containing 1% sulfur, to which DMDS was added, to obtain 2% sulfur content.

To activate the catalyst, the reaction vessel was pressurized to 45 bars, using hydrogen followed by a 30 minute purge. The hydrogen flow was 27.5 NL/h and the temperature was increased to 175° C., in 25° C./hr increments.

Commercially available activating solution (DMDS), was added at LHSV of 3 h$^{-1}$, and held for 3 hours. The temperature was increased to 250° C. at the same rate as above. The concentration of H$_2$S in the vessel was monitored every 30 minutes, until the level in the off gas exceeded 0.2 V %. Catalyst activation continued for 8 hours.

The rate of activation of the catalysts can be seen in FIG. 4.

Example 2

This example compares commercially available DMDS sulfiding to DSO obtained using the invention. The DSO was obtained by combining the DSOs from propane and butane MEROX units, as described supra.

Activating solutions were prepared using kerosene fractions containing 1% sulfur, to which DSO was added, to obtain 2% sulfur content.

The vessel was pressurized to 45 bars, with hydrogen gas, and purged for 30 minutes. The rate of hydrogen flow was set at 27.5 NL/h, and the reactor temperature was increased to 175° C., at a rate of 25° C./hour.

The catalyst activating solution was fed to the vessel, at a LHSV of 3 h$^{-1}$, and held for 3 hours. The reactor temperature was then increased to 250° C., at a rate of 25° C./hour. The H$_2$S gas concentration was monitored every 30 minutes for sulfur breakthroughs, until the H$_2$S concentration was greater than 0.2 V % in off gas. The vessel was held with the same gas and liquid flow rates for 8 hours, to complete activation.

FIG. 4 shows the activation data for both activating agents. It will be seen that the activation was similar.

Example 3

The activated catalysts of Examples 1 and 2 were tested, using an SR gas oil, derived from a mix of Arabian light and heavy crude (25:75). Properties of the feedstock are in the following Table;

TABLE 4

Feedstock properties and composition.

| Property | Unit | Value |
|---|---|---|
| Sulfur | W % | 1.45 |
| Density | g/cc | 0.8448 |
| Nitrogen | ppmw | 98 |
| 0 | ° C. | 113 |
| 5 | ° C. | 172 |
| 10 | ° C. | 198 |
| 20 | ° C. | 233 |
| 30 | ° C. | 254 |
| 40 | ° C. | 273 |
| 50 | ° C. | 293 |
| 60 | ° C. | 311 |
| 70 | ° C. | 330 |
| 80 | ° C. | 352 |
| 90 | ° C. | 379 |
| 95 | ° C. | 400 |
| 100 | ° C. | 437 |

The feedstock wastested at constant pressure of 46 bars, LHSV of 0.95 h$^{-1}$, and temperatures in the range 320° C.-400° C.

These conditions follow:

TABLE 5

Operating conditions of hydrotreating tests.

| Variable | Unit | Test 1 | Test 2 |
|---|---|---|---|
| Catalyst activating Agent | | DMDS | DSO |
| Hydrogen partial pressure | Bar | 46 | 46 |
| LHSV | h$^{-1}$ | 0.95 | 0.95 |
| Temperature | ° C. | 300, 310, 320, 330, 340, 350, 360, 380 and 400 | 300, 320 and 340 |
| Duration | days | 3 at each temperatures | 3 at 300 and 2 days at 320 and 340 |

The results are presented in FIG. 5. As seen both commercial DMDS and extracted DSO were effective in activating the hydroprocessing catalysts, converting it from oxide form into sulfide form.

The foregoing invention describes an integrated process for removing sulfur containing hydrocarbons from hydrocarbon feed, and then processing these to materials useful for activating a hydrocracking catalyst. The sulfur compounds, once removed into a caustic solvent, may be treated in one of two ways, it being understood that mercaptans, when contacted with an alkali react as follows:

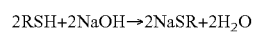

It is to be understood that "NaOH" is representative of other alkalis including, but not being limited to KOH, LiOH, other alkali hydroxides, and other alkali materials.

The resulting thiolate, i.e., NaSR, or any compound of formula XSR (where X is the cation of the alkali), can then either be oxidized in the presence of a catalyst to form a disulfide, viz:

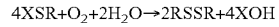

or can be treated in the presence of acid and a catalyst:

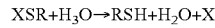

If the first reaction, i.e., oxidation, is used, it is preferably carried out at a temperature of 20° C. to 80° C., but can range from 20° C. to 300° C. The second reaction is preferably carried out at 20° C. to 100° C., and preferably at 20° C.-80°

C., at a pressure of from 1-30 bars, and for 15-60 minutes, although these parameters are not critical.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

We claim:

1. An integrated process for removing sulfur containing hydrocarbons from a hydrocarbon feedstock and activating a hydroprocessing catalyst, comprising:
   (i) contacting said hydrocarbon feedstock to an alkaline extraction solution in an extraction vessel, to remove sulfides, disulfides, and mercaptans;
   (ii) reacting the mercaptans with an alkali in said alkaline extraction solution to form thiolates;
   (iii) contacting said thiolates with oxygen in the presence of a catalyst, to form a mixture of sulfides and disulfides;
   (iv) removing any sulfides and disulfides from said alkaline solution by adsorbing said sulfides and disulfides to an adsorbent, to form a mixture;
   (v) removing any non-sulfur compounds from said mixture, and
   (vi) activating a hydroprocessing catalyst by contact of said sulfur containing compounds to said hydroprocessing catalyst.

2. The process of claim 1, comprising carrying out (i) and (ii) at a temperature of 15° C. to 80° C.

3. The process of claim 2, comprising carrying out (i) and (ii) at a temperature of 40° C. to 60° C.

4. The process of claim 1, comprising carrying out (i) and (ii) at a pressure of 10-50 bars.

5. The process of claim 1, comprising carrying out (iii) at a temperature of from 20° C. to 300° C.

6. The process of claim 5, comprising carrying out (iii) at a temperature of from 20° C. to 80° C.

7. The process of claim 1, comprising removing water soluble sulfur containing compounds in (iv) via a water wash.

8. The method of claim 1, wherein said adsorbent is activated carbon alumina, silica alumina, sand, a zeolite, or a regenerated spent catalyst.

9. The method of claim 1, wherein said hydrocarbon feedstream is natural gas, fuel gas, liquefied petroleum gas, a pentane mixture, light straight run naphtha, light thermally cracked naphtha, full straight run naphtha, full FCC cracked naphtha, heavy FCC cracked naphtha, heavy SR naphtha, aviation turbine fuel, kerosene, or a distillate fuel having a boiling point of up to 350° C.

10. The process of claim 1, wherein said extraction vessel comprises a plurality of liquid-liquid contacting decks.

* * * * *